US012651972B2

(12) United States Patent
Manzoni et al.

(10) Patent No.: US 12,651,972 B2
(45) Date of Patent: Jun. 9, 2026

(54) SYNCHRONOUS RECTIFICATION ADAPTIVE TURN-ON/TURN-OFF METHOD

(71) Applicant: STMicroelectronics International N.V., Geneva (CH)

(72) Inventors: Stefano Manzoni, Milan (IT); Daniele Cazzaniga, Lissone (IT)

(73) Assignee: STMicroelectronics International N.V., Geneva (CH)

( * ) Notice: Subject to any disclaimer, the term of this patent is extended or adjusted under 35 U.S.C. 154(b) by 175 days.

(21) Appl. No.: 18/628,974

(22) Filed: Apr. 8, 2024

(65) Prior Publication Data

US 2025/0317068 A1     Oct. 9, 2025

(51) Int. Cl.
    *H02M 3/335*     (2006.01)
    *H02M 3/00*     (2006.01)
(52) U.S. Cl.
    CPC ......... *H02M 3/33592* (2013.01); *H02M 3/01* (2021.05); *H02M 3/33571* (2021.05)
(58) Field of Classification Search
    CPC . H02M 3/33592; H02M 3/33571; H02M 3/01
    See application file for complete search history.

(56) References Cited

U.S. PATENT DOCUMENTS

| | | |
|---|---|---|
| 7,688,602 B2 | 3/2010 | Hu |
| 9,270,190 B2 | 2/2016 | Ganesh Kumar |
| 9,356,535 B2 * | 5/2016 | Iorio .................... H02M 7/217 |
| 10,177,659 B2 | 1/2019 | Dalena et al. |
| 10,256,717 B2 | 4/2019 | Ye et al. |

(Continued)

FOREIGN PATENT DOCUMENTS

| | | |
|---|---|---|
| CN | 105245094 A | 1/2016 |
| CN | 110504823 A | 11/2019 |

(Continued)

OTHER PUBLICATIONS

Zhou, Xiang, et al.: "Accurate Analysis and Design of the Circuit Parameters of LLC DC-DC Converter with Synchronous Rectification," IEEE Power Electronics Regular Paper/Letter/ Correspondence, IEEE Transactions on Power Electornics, Dec. 2022, 15 pgs.

*Primary Examiner* — Rafael O Leon De Domenech
(74) *Attorney, Agent, or Firm* — Crowe & Dunlevy LLC

(57)     ABSTRACT

A DC-DC LLC resonant-converter utilizes a synchronous-rectifier stage with first and second branches. In a calibration-cycle, a first elapsed-time from commutation of a drain-to-source voltage of the first branch's transistor, through inversion of the current in the first branch, to a next zero-crossing of that current is measured, and a second elapsed-time is measured the same way for the second branch. In a normal operating-cycle thereafter, turn-on of the first branch's transistor with respect to commutation of its drain-to-source voltage is delayed by the first elapsed-time, and turn-on of the second branch's transistor with respect to commutation of its drain-to-source voltage is delayed by the second elapsed-time. The first branch's transistor is turned-off in response to change in slope of a drain-to-source voltage of the second branch's transistor, and the second branch's transistor is turned-off in response to change in slope of a drain-to-source voltage of the first branch's transistor.

20 Claims, 11 Drawing Sheets

(56)                    References Cited

U.S. PATENT DOCUMENTS

| | | | |
|---|---|---|---|
| 2010/0290256 A1* | 11/2010 | Zhou ................. | H02M 3/33592 |
| | | | 363/21.02 |
| 2012/0063175 A1* | 3/2012 | Wang ................ | H02M 3/33592 |
| | | | 363/21.14 |
| 2017/0317598 A1 | 11/2017 | Ptacek et al. | |
| 2018/0152111 A1* | 5/2018 | Tschirhart ......... | H02M 3/33592 |
| 2018/0301999 A1* | 10/2018 | Moon ............... | H02M 3/33592 |
| 2020/0336071 A1* | 10/2020 | Iorio ................. | H02M 3/33592 |
| 2023/0343504 A1 | 10/2023 | Spinella et al. | |

FOREIGN PATENT DOCUMENTS

| | | | |
|---|---|---|---|
| CN | 117254673 A | 12/2023 | |
| WO | 2017137342 A1 | 8/2017 | |
| WO | 2022034223 A1 | 2/2022 | |

* cited by examiner

SYNCHRONOUS RECTIFICATION ADAPTIVE TURN-ON/TURN-OFF METHOD

TECHNICAL FIELD

This disclosure is directed to the field of switched-mode power supplies (SMPS) and, in particular, to techniques for controlling the rectification stage of an SMPS, based on a LLC tank converter.

BACKGROUND

Switched-mode power supplies (SMPS) are widely used in electronic devices to convert electrical power from one voltage level to another. They regulate output voltage through the high frequency switching of power transistors and energy storage in inductors and capacitors. An example of a SMPS is depicted in FIG. 1 and operates as a DC-DC LLC resonant converter 10, utilizing a battery VBATT as its energy source. The converter incorporates high and low-side n-channel MOSFETs, M1 and M2, which are sequentially driven by respective high and low-side control signals, HS and LS, to alternately conduct. Transistor M1 connects the battery voltage VBATT to a transformer primary winding Lp via node N, while transistor M2 grounds the primary winding Lp. An inductor L1 and capacitor Cc1 form an LC resonant tank. The transformer features dual secondary windings Ls1, Ls2, serving to step the battery voltage VBATT to desired levels and provide galvanic isolation between input and output. A passive rectification stage comprises diodes Dd1 and Dd2 connected to the secondary windings Ls1, Ls2, with these diodes rectifying the AC voltage induced in the secondary windings Ls1, Ls2. The output is then smoothed by capacitor COUT to provide a steady DC output at VOUT, with resistor RL representing a load.

Passive rectification, however, may suffer from undesirably high power losses due to the voltage drop across diodes Dd1, Dd2. Therefore, the DC-DC LLC resonant converter may have its passive rectification stage replaced with an active rectification stage.

A DC-DC LLC resonant converter 10' utilizing such an active rectification stage is shown in FIG. 2. In this arrangement, the secondary winding Ls1 is connected at its high-side to the output node No and at its low-side through n-channel MOSFET M3 to ground. Transistor M3 is controlled by a gate drive signal GD1, allowing for active control of its conduction period, effectively replacing a traditional diode's role with minimized voltage drop and power losses. Similarly, the secondary winding Ls2 has its high-side connected to output node No and its low-side controlled by n-channel MOSFET M4, which is controlled by gate drive signal GD2.

A challenge in implementing this synchronous rectification is the precise timing required to switch the MOSFETs M3, M4 on and off to optimize efficiency and prevent current inversion in the active rectification stage.

Ideally, the appropriate MOSFET is to be turned on when its respective secondary winding is forward biased and the MOSFET's substrate diode starts to conduct (i.e., when the voltage across that secondary winding is in the correct polarity for that MOSFET to conduct) and turned off just before or as the current through that winding goes to zero.

In greater detail, turn on of the appropriate MOSFET must occur when the current starts to flow in the rectification branch. When the output current is high (close to the maximum rating of the converter), as soon as the primary side current toggles, the current starts flowing in the secondary branch that is forward biased in that cycle. Thus, proper turn on timing at high output current is not particularly difficult to achieve.

However, when output current is low, the rectified the rectified current rises with an increasing delay from the time the primary side current has toggled. Furthermore, just after the primary side current toggles, a capacitive spike appears at the secondary branch that is forward biased in that cycle. This capacitive spike is related to the parasitic capacitance of the transformer. In a certain load range, the current flowing in the secondary branch is formed by the capacitive spike and the actual rectified current pulse.

The control circuitry can handle this by behaving in one of two ways. The control circuitry could turn on/off at the capacitive spike and at the rectified current pulse, which doubles the switching frequency. Or, the control circuitry could turn on/off only at the rectified current pulse—here, the capacitive spike will be rectified by the body diode of the MOSFET of the secondary branch, but the doubling of the switching frequency is avoided.

When the load is very low, only the capacitive spike remains and the control circuitry must behave accordingly—it cannot maintain the transistor as being on while there is not current flowing from the primary, otherwise the current direction the secondary will be inverted and will flow from COUT, to the secondary winding of the secondary branch on, back to the primary.

Indeed, the timing of the turn-off of the MOSFET is important. If the MOSFET remains on when the current through its associated secondary winding goes to zero (i.e. the MOSFET is not turned off at the proper time), then current may flow from the output capacitor COUT, back through the secondary winding, and through the channel of the MOSFET (that is not yet turned off) to ground—this is known as a current inversion as the direction of current flow in the active rectification stage has reversed. Turning off the MOSFET during current inversion leads to a voltage spike across the transistor. This spike results from the sudden interruption of current, which, when combined with the stray inductances of the circuit, induces a high voltage. This voltage spike can easily exceed the absolute maximum ratings (AMR) of the MOSFET or to the control circuitry utilized, potentially leading to component failure and reducing reliability of the power supply.

The zero-crossing point of the rectified current signifies the proper moment for transistor turn-off. This moment can be considered the handshake between the rectifying branches in a multi-branch synchronous rectifier, indicating when the current through the secondary winding and its associated transistor has ceased, and thus when the transistor is be turned off to prevent unnecessary power dissipation.

If the zero-crossing of the rectified current is detected prematurely, it negatively impacts the efficiency of the converter. This early detection leads to the unnecessary early deactivation of the transistor, which, in turn, can result in the premature engagement of the intrinsic body diode of the transistor, increasing power losses due to its forward voltage drop. Conversely, delayed detection of the zero-crossing, or a delay in the action taken following detection, compromises both the robustness and efficiency of the converter. Indeed, a delay in turning off the transistor allows current to flow in the reverse direction through the channel of the transistor once the current through the secondary winding has ceased, leading to increased power dissipation and potential stress on the transistor.

Inductive advance further complicates the timing of the transistors within the active rectification stage. Inductive advance refers to the effect of parasitic inductance present from the transistor channel to its terminals, combined with the drain-source on-resistance of the transistor. This parasitic inductance causes the drain-to-source voltage signal, which is used to sense when to turn the transistor on or off, to lead the actual rectified current. Consequently, the drain-to-source voltage signal may indicate that it is time to turn off the transistor before the current through the secondary winding has actually ceased. The challenge is further exacerbated at the turn-off moment. If detection is solely based on the raw drain-to-source voltage signal, the timing may not accurately reflect the actual cessation of current through the transistor. As a result, the channel the transistor may continue to conduct for a period corresponding to the inductive advance, negatively impacting the converter's efficiency. The inductive advance, a direct consequence of the interplay between the parasitic inductance and the channel resistance, thus represents another obstacle in achieving optimal synchronous rectification.

As such, further development into control techniques for such DC-DC converters with active rectification stages is needed so as to provide for proper turn-on and turn-off timing of the transistors in the active rectification stage.

SUMMARY

Disclosed herein is a synchronous rectifier circuit, including: a first secondary winding connected between an output node and a first rectification transistor, the first secondary winding configured to be magnetically coupled to a primary winding; wherein the first rectification transistor is connected between the first secondary winding and ground; wherein the first rectification transistor is configured to be operable to perform rectification during a normal operating cycle; and a controller. The controller is configured to control the first rectification transistor to perform synchronous rectification by, in a calibration cycle: measuring a first elapsed time beginning at commutation of a drain-to-source voltage of the first rectification transistor, continuing through inversion of a current in the first secondary winding, and ending at a next zero crossing of the current in the first secondary winding, to thereby determine a first delay time.

In a normal operating cycle occurring immediately subsequent to the calibration cycle, the controller is configured to control the first rectification transistor to perform synchronous rectification by: delaying turn-on of the first rectification transistor with respect to the commutation of the drain-to-source voltage of the first rectification transistor by an amount at least equal to the first determined delay time, and then turning on the first rectification transistor after the delay; and turning off the first rectification transistor.

The controller may cause the first rectification transistor to perform the calibration cycle in response to detection of inversion of the current in the first secondary winding.

The controller may be configured to slowly decrease the delaying of the turn-on of the first rectification transistor over time so that the delay eventually decreases to zero if the detection of the inversion of current in the first secondary winding does not reoccur.

The controller, in the calibration cycle, may measure the first elapsed time beginning at the commutation of the drain-to-source voltage of the first rectification transistor, continuing through the inversion of the current in the first secondary winding that results in the current in the first secondary winding becoming negative, and ending at a next negative-to-positive zero crossing of the current in the first secondary winding, to thereby determine the delay time.

The controller may include: a first comparator; a first current source and first capacitor coupled in parallel between a non-inverting input of the first comparator and ground; a second current source and a second capacitor coupled in parallel between an inverting input of the first comparator and ground; and control circuitry. The control circuitry may be configured to, during a normal operating cycle: enable the second current source so that it sources current to the second capacitor during a first elapsed time occurring during the inversion of the current in the first secondary winding, and disable the second current source at the ending of the first elapsed time; and enable the first current source at commutation of the drain-to-source voltage of the first rectification transistor so that the first current source sources current to the first capacitor, activate the first rectification transistor when an output of the first comparator is asserted to indicate that a voltage across the first capacitor has become at least equal to a voltage across the second capacitor, and discharge the first capacitor through a first switch and disable the first current source at an end of the normal operating cycle.

The control circuitry may be configured to detect the inversion of the current in the first secondary winding based upon the drain-to-source voltage of the first rectification transistor.

The controller further may also include a first discharge resistor connected between the inverting input of the first comparator and ground.

A second secondary winding may be connected between the output node and a second rectification transistor, the second secondary winding configured to be magnetically coupled to the primary winding. The second rectification transistor may be connected between the second secondary winding and ground. The second rectification transistor may also be configured to be alternatingly operable to perform rectification during the normal operating cycle.

The controller may also be configured to control the second rectification transistor to perform synchronous rectification by, in the calibration cycle, measuring a second elapsed time beginning at commutation of a drain-to-source voltage of the second rectification transistor, continuing through inversion of a current in the second secondary winding, and ending at a next zero crossing of the current in the second secondary winding, to thereby determine a second delay time. The controller may also be configured to control the second rectification transistor to perform synchronous rectification by, in the normal operating cycle occurring immediately subsequent to the calibration cycle: delaying turn-on of the second rectification transistor with respect to the commutation of the drain-to-source voltage of the second rectification transistor by an amount at least equal to the second determined delay time, and then turning on the second rectification transistor after the delay; and turning off the second rectification transistor.

The delaying of the turn-on of the first rectification transistor by the amount at least equal to the first determined delay time may serve to avoid excess ringing of a drain-to-source voltage of the second rectification transistor, the delaying of the turn-on of the second rectification transistor by the amount at least equal to the second determined delay time may serve to avoid excess ringing of a drain-to-source voltage of the first rectification transistor.

The controller may cause the first rectification transistor to perform the calibration cycle in response to detection of inversion of the current in the first secondary winding.

The controller may cause the second rectification transistor to perform the calibration cycle in response to detection of inversion of the current in the second secondary winding.

The controller may be configured to slowly decrease the delaying of the turn-on of the first rectification transistor over time so that the delay eventually decreases to zero if the detection of the inversion of current in the first secondary winding does not reoccur. The controller may be configured to slowly decrease the delaying of the turn-on of the second rectification transistor over time so that the delay eventually decreases to zero if the detection of the inversion of current in the second secondary winding does not reoccur.

The controller, in the calibration cycle, may measure the first elapsed time beginning at the commutation of the drain-to-source voltage of the first rectification transistor, continuing through the inversion of the current in the first secondary winding that results in the current in the first secondary winding becoming negative, and ending at a next negative-to-positive zero crossing of the current in the first secondary winding, to thereby determine the delay time.

The controller, in the calibration cycle, may measure the second elapsed time beginning at the commutation of the drain-to-source voltage of the second rectification transistor, continuing through the inversion of the current in the second secondary winding that results in the current in the second secondary winding becoming negative, and ending at a next negative-to-positive zero crossing of the current in the second secondary winding, to thereby determine the delay time.

The controller may include: a first comparator; a first current source and a first capacitor coupled in parallel between a non-inverting input of the first comparator and ground; a second current source and a second capacitor coupled in parallel between an inverting input of the first comparator and ground; a second comparator; a third current source and a third capacitor coupled in parallel between a non-inverting input of the second comparator and ground; a fourth current source and a fourth capacitor coupled in parallel between an inverting input of the second comparator and ground; and control circuitry. The control circuitry may be configured to, during a normal operating cycle: enable the second current source so that it sources current to the second capacitor during a first elapsed time occurring during the inversion of the current in the first secondary winding, and disable the second current source at the ending of the first elapsed time; enable the first current source at commutation of the drain-to-source voltage of the first rectification transistor so that the first current source sources current to the first capacitor, activate the first rectification transistor when an output of the first comparator is asserted to indicate that a voltage across the first capacitor has become at least equal to a voltage across the second capacitor, and discharge the first capacitor through a first switch and disable the first current source at an end of the normal operating cycle; enable the fourth current source so that it sources current to the fourth capacitor during a second elapsed time occurring during the inversion of the current in the second secondary winding, and disable the fourth current source at the ending of the second elapsed time; and enable the third current source at commutation of the drain-to-source voltage of the second rectification transistor so that the third current source sources current to the third capacitor, activate the second rectification transistor when an output of the second comparator is asserted to indicate that a voltage across the third capacitor has become at least equal to a voltage across the fourth capacitor, and discharge the third capacitor through a second switch and disable the third current source at an end of the normal operating cycle.

The control circuitry may also be configured to detect the inversion of the current in the first secondary winding based upon the drain-to-source voltage of the first rectification transistor; and wherein the control circuitry is configured to detect the inversion of the current in the second secondary winding based upon the drain-to-source voltage of the second rectification transistor.

The controller may also include a first discharge resistor connected between the inverting input of the first comparator and ground and a second discharge resistor connected between the inverting input of the second comparator and ground.

Also disclosed herein is a synchronous rectifier circuit, including: a first secondary winding connected between an output node and a first rectification transistor, the first secondary winding configured to be magnetically coupled to a primary winding; wherein the first rectification transistor is connected between the first secondary winding and ground; a second secondary winding connected between the output node and a second rectification transistor, the second secondary winding configured to be magnetically coupled to the primary winding; wherein the second rectification transistor is connected between the second secondary winding and ground; and wherein the first rectification transistor and second rectification transistor are configured to be alternatingly operable to perform rectification during a normal operating cycle; and a controller.

The controller may be configured to control the first rectification transistor and the second rectification transistor to perform synchronous rectification by, in a normal operating cycle: turning on the first rectification transistor; and causing turn-off of the first rectification transistor in response to detection of a substantial change in slope of a drain-to-source voltage of the second rectification transistor.

The controller may include: a first comparator having a first input coupled to receive a divided version of the drain-to-source voltage of the second rectification transistor; a first low-pass filter coupled between the divided version of the drain-to-source voltage of the second rectification transistor and a second input of the first comparator, with a first voltage offset being added at an output of the first low-pass filter; and a control circuit configured to cause the turn-off of the first rectification transistor in response to assertion of an output of the first comparator.

The controller may include: a first comparator; a first derivative filter coupled between the drain-to-source voltage of the second rectification transistor and a first input of the first comparator; a first reference voltage coupled to a second input of the first comparator; and a control circuit configured to cause the turn-off of the first rectification transistor in response to assertion of an output of the first comparator.

The controller may be further configured for, in a normal operating cycle: turning on the second rectification transistor; and causing turn-off of the second rectification transistor in response to detection of a substantial change in slope of a drain-to-source voltage of the first rectification transistor.

The controller may include: a first comparator having a first input coupled to receive a divided version of the drain-to-source voltage of the second rectification transistor; a first low-pass filter coupled between the divided version of the drain-to-source voltage of the second rectification transistor and a second input of the first comparator, with a first voltage offset being added at an output of the first low-pass filter; a second comparator having a first input coupled to receive a divided version of the drain-to-source voltage of the first rectification transistor; a second low-pass filter coupled between the divided version of the drain-to-source voltage of the first rectification transistor and a second input of the second comparator, with a second voltage offset being added at an output of the second low-pass filter; and a control circuit. The control circuit may be configured to: cause the turn-off of the first rectification transistor in response to assertion of an output of the first comparator; and cause the turn-off of the second rectification transistor in response to assertion of an output of the second comparator.

The controller may include: a first comparator; a first derivative filter coupled between the drain-to-source voltage of the second rectification transistor and a first input of the first comparator; a first reference voltage coupled to a second input of the first comparator; a second comparator; a second derivative filter coupled between the drain-to-source voltage of the first rectification transistor and a first input of the second comparator; a second reference voltage coupled to a second input of the second comparator; and a control circuit configured to cause the turn-off of the first rectification transistor in response to assertion of an output of the first comparator, and to cause the turn-off of the second rectification transistor in response to assertion of an output of the second comparator.

DETAILED DESCRIPTION

The following disclosure enables a person skilled in the art to make and use the subject matter described herein. The general principles outlined in this disclosure can be applied to embodiments and applications other than those detailed above without departing from the spirit and scope of this disclosure. It is not intended to limit this disclosure to the embodiments shown, but to accord it the widest scope consistent with the principles and features disclosed or suggested herein.

Note that in the following description, any resistor or resistance mentioned is a discrete device, unless stated otherwise, and is not simply an electrical lead between two points. Therefore, any resistor or resistance connected between two points has a higher resistance than a lead between those two points, and such resistor or resistance cannot be interpreted as a lead. Similarly, any capacitor or capacitance mentioned is a discrete device, unless stated otherwise, and is not a parasitic element, unless stated otherwise. Additionally, any inductor or inductance mentioned is a discrete device, unless stated otherwise, and is not a parasitic element, unless stated otherwise.

Figure 3:
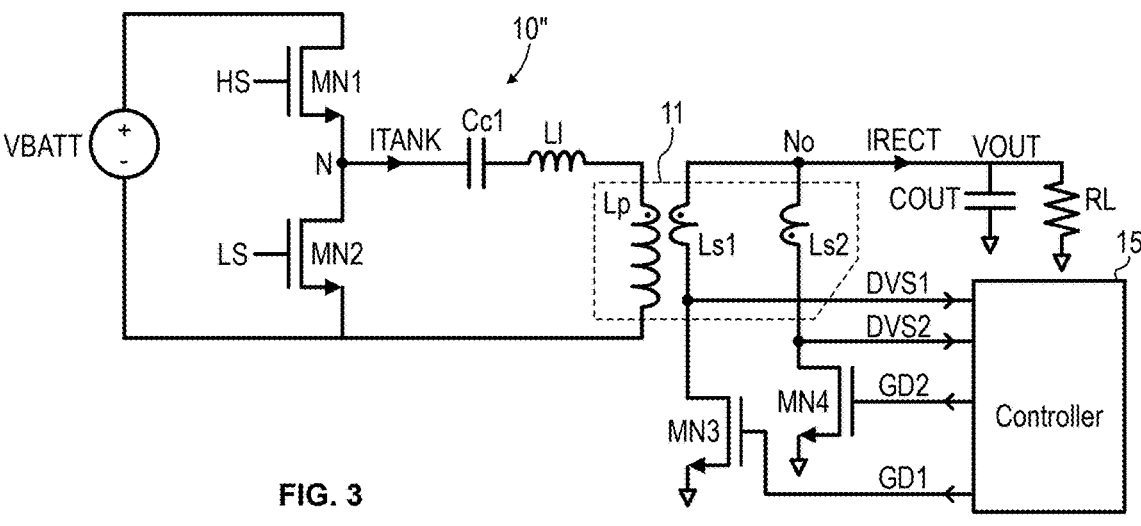
FIG. 3 is a schematic diagram of a SMPS with an active rectification stage including a controller that adjusts the turn-on and turn-off times of the transistors of the active rectification stage, as disclosed herein.

Now described with initial reference to FIG. 3 is a DC-DC LLC resonant converter 10" utilizing an active rectification stage. In this arrangement, high-side n-channel transistor MN1 and low-side n-channel transistor MN2 are series connected between the battery voltage VBATT and ground, with node N being the tap between MN1 and MN2. N-channel transistors MN1 and MN2 have their gates respectively coupled to high-side and low-side control signals HS and LS. A capacitor Cc1 and inductor L1 are series connected between the tap node N and a first terminal of primary winding Lp of transformer 11, with a second terminal of the primary winding Lp being connected to ground.

The transformer 11 includes two secondary windings Ls1 and Ls2, with secondary winding Ls1 being arranged so that its voltage is in phase with that of primary winding Lp and having its first terminal connected to output node No and its second terminal coupled to ground through n-channel transistor MN3, with secondary winding Ls2 being arranged so that its voltage is opposite in phase to that of primary winding Lp and having its first terminal connected to node No and its second terminal coupled to ground through n-channel transistor MN4. N-channel transistor MN3 has its gate coupled to gate drive signal GD1, and n-channel transistor MN4 has its gate coupled to gate drive signal GD2. The source of n-channel transistor MN3 is connected to ground so that the drain-to-source voltage of MN3 can be measured by controller 15 at the drain of MN3, with this voltage being labelled as DVS1, and the source of n-channel transistor MN4 is connected to ground so that the drain-to-source voltage of MN4 can be measured by controller 15 at the drain of MN4, with this voltage being labelled as DVS2.

A controller 15 receives the drain-to-source voltages DVS1 and DVS2 as input and generates the gate drive signals GD1 and GD2 so as to control the timing of turn-on and turn-off of the n-channel transistors MN3 and MN4 as will be described hereinbelow.

Figure 4:
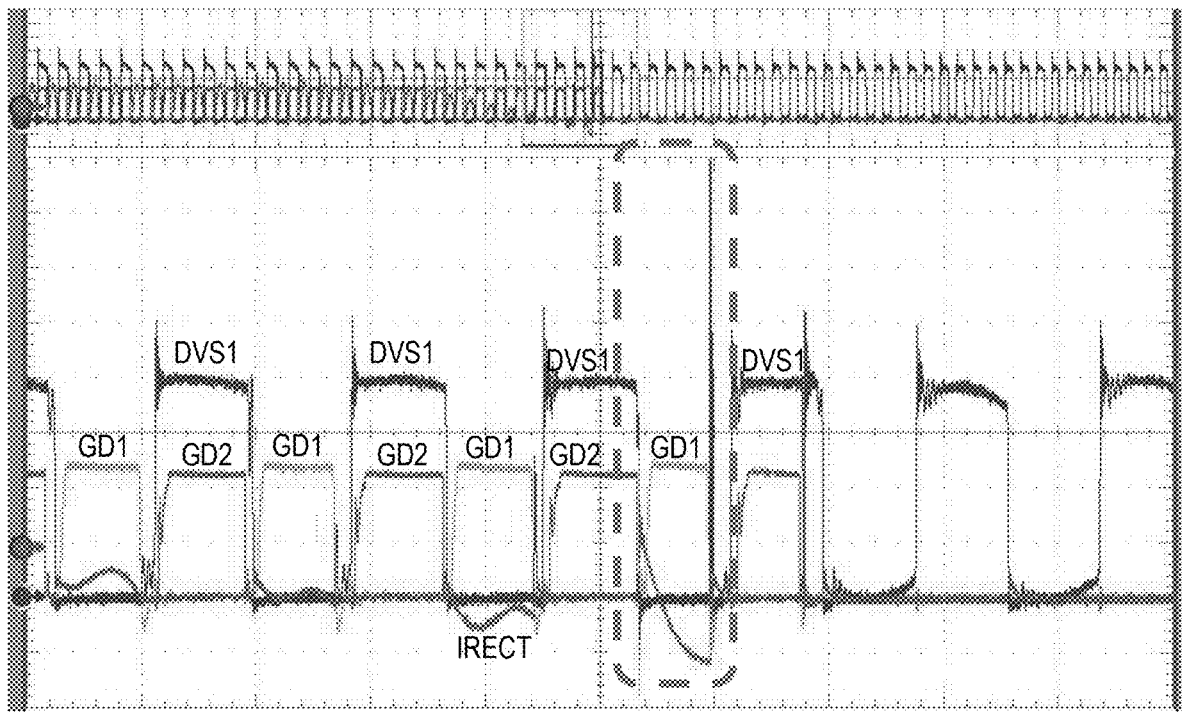
FIG. 4 is a graph showing voltages of the SMPS of FIG. 3 measured using an oscilloscope during operation in which a current inversion occurs.

Illustrated in FIG. 4 is a non-ideal operating scenario for the DC-DC LLC resonant converter 10" of FIG. 3 that it is desired to mitigate. This figure highlights a condition (shown in the box formed by a dashed line) where the secondary side rectified current IRECT is adversely affected by what is referred to a capacitive spike.

Consider first, however, what is to occur during operation. Depending which of transistor MN1 and MN2 is on to conduct current through the primary winding Lp, a corresponding one of transistors MN3 and MN4 will be on to conduct a rectified current VRECT in a same direction through its associated secondary winding Ls1 or Ls2. When the half-bridge formed by transistors MN1 and MN2 toggles (e.g., the conducting transistor MN1 or MN2 turns off and the non-conducting transistor MN2 or MN1 turns on), the operation of transistors MN3 and MN4 is to toggle as well. Ideally, the turn-on of transistor MN3 or MN4 would coincide with the forward biasing of its respective secondary winding Ls1 or Ls2 and turned off just before or as the current through that winding goes to zero. As explained above, this timing prevents a current inversion.

A capacitive spike occurs at the half-bridge voltage transition, or toggling, where the voltage across the primary winding Lp of the transformer 11 switches states due to the alternating turn-on and turn-off of the high-side and low-side transistors MN1 and MN2. This capacitive spike is largely attributed to the parasitic capacitance at the secondary windings Ls1, Ls2.

Indeed, in an inductor-inductor-capacitor (LLC) tank circuit (Cc1, L1, and Lp forming the tank), the output capacitance of the transistors MN3 and MN4 of the synchronous rectifier is effectively in parallel with the secondary winding Ls1, Ls2 of the transformer. The effect of this is that the parasitic capacitance at the secondary side is reflected to the primary side. This reflection transforms the resonant tank from a simple LLC configuration into a more complex inductor-inductor-capacitor-capacitor (LLC-C) circuit, where the additional capacitor represents the reflected parasitic capacitance.

Under heavy load conditions, the capacitive spike is typically masked by the higher current flowing from the primary side to the secondary side of the transformer. This is because the substantial energy transfer overshadows the transient effects of the capacitive spike, rendering it indistinguishable. Consequently, toggling of the transistors MN3 and MN4 under these conditions does not present particular issues related to the capacitive spike.

However, at light load conditions, the capacitive spike and resonant current become distinguishable. As the load decreases, the resonant current reduces accordingly, but the capacitive spike remains relatively constant in magnitude. This disparity is due to the capacitive spike being less dependent on the rectified current and more a function of the switching events and the output capacitance of the transistors MN3 and MN4. This can pose challenges in controlling transistors, as the capacitive spike can affect the voltage across a transistor at turn-on, potentially leading to increased stress or switching losses if not properly managed. Therefore, regarding the timing of the transistors MN3 and MN4, it is also desired for transistor switching to occur during the capacitive spike.

Continuing with the description of the non-ideal operating scenario for the DC-DC LLC resonant converter 10" of FIG. 3, shown in FIG. 4, the undesirable event captured within the dashed box signifies an occurrence where the synchronous rectification transistor MN3 is activated immediately subsequent to the half-bridge voltage toggle, at the commencement of the capacitive spike. This is followed by a mis-timed gate drive signal GD1 pulse that fails to disengage at the conclusion of the capacitive spike, resulting in a current inversion and an associated large spike in the drain-to-source voltage DVS1. Such conditions can precipitate the drain-to-source voltage peak to reach or exceed the absolute maximum rating (AMR) of the transistor GD1 and the controller 15, potentially leading to component stress or failure.

Therefore, the aim of the operation of the controller 15 is to address this issue by preventing DVS ringing at transistor turn-off during current inversion and enables the precise determination of the turn-on delay to bypass the capacitive spike within a single operational cycle, thus ensuring the reliability and efficiency of the DC-DC LLC resonant converter operation.

One control approach considered involves synchronizing of the turn-on and turn-off of the transistors MN3 and MN4 of the synchronous rectifier with both the capacitive spike and the rectified current, effectively doubling the switching frequency. While this may ensure that the appropriate transistor is active precisely when needed, this may come at the cost of the power dissipation due to the heightened switching activity. Additionally, any delay in turning off the transistor may lead to undesirable ringing in the drain-to-source voltage of that transistor, further complicating the control strategy.

Therefore, the controller 15 as described herein implements a technique to adjust the turn-on delay of the transistors MN3 and MN4 of the synchronous rectifier to bypass the capacitive spike, activating the transistors MN3 and MN4 of the synchronous rectifier solely during the presence of the rectified current IRECT. This aims to therefore reduce switching losses by reducing the number of switching events and eliminate the ringing of the respective gate-to-source voltage DVS1 and DVS2 that occurs at turn-off during the capacitive spike.

As stated, current inversion occurs when a transistor MN3 or MN4 of the synchronous rectifier is on in an absence of current transfer from the primary Lp to the corresponding secondary Ls1 or Ls2.

In a calibration cycle performed by the controller 15, the operation of the controller 15 keeps the conducting transistor MN3 or MN4 of the synchronous rectifier on during a current inversion, the detection of which will be explained below. When the current in the secondary experiences a positive zero cross (e.g., is no longer flowing in reverse), then the conducting transistor MN3 or MN4 of the synchronous rectifier is turned off. Thus, the conducting transistor is kept on until the current inversion has ended during the calibration cycle. The time the current inversion takes to vanish is measured and stored by the controller 15 to be used as the turn-on delay to be applied at the next switching cycle. This avoids ringing of the drain-to-source voltages DVS1 and DVS2.

Figure 5:
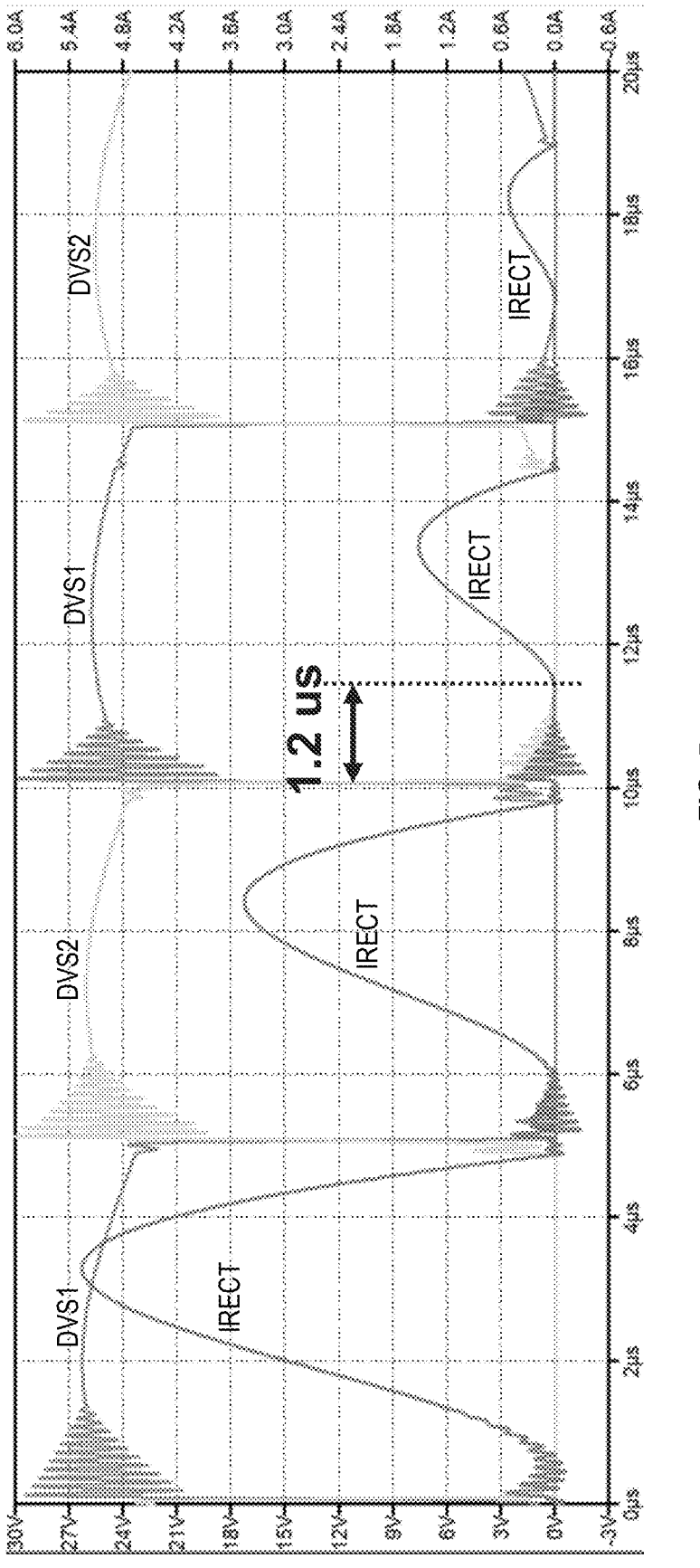
FIG. 5 is a graph showing simulated voltages of the SMPS of FIG. 3 during operation in which a current inversion does not occur.
Figure 6:
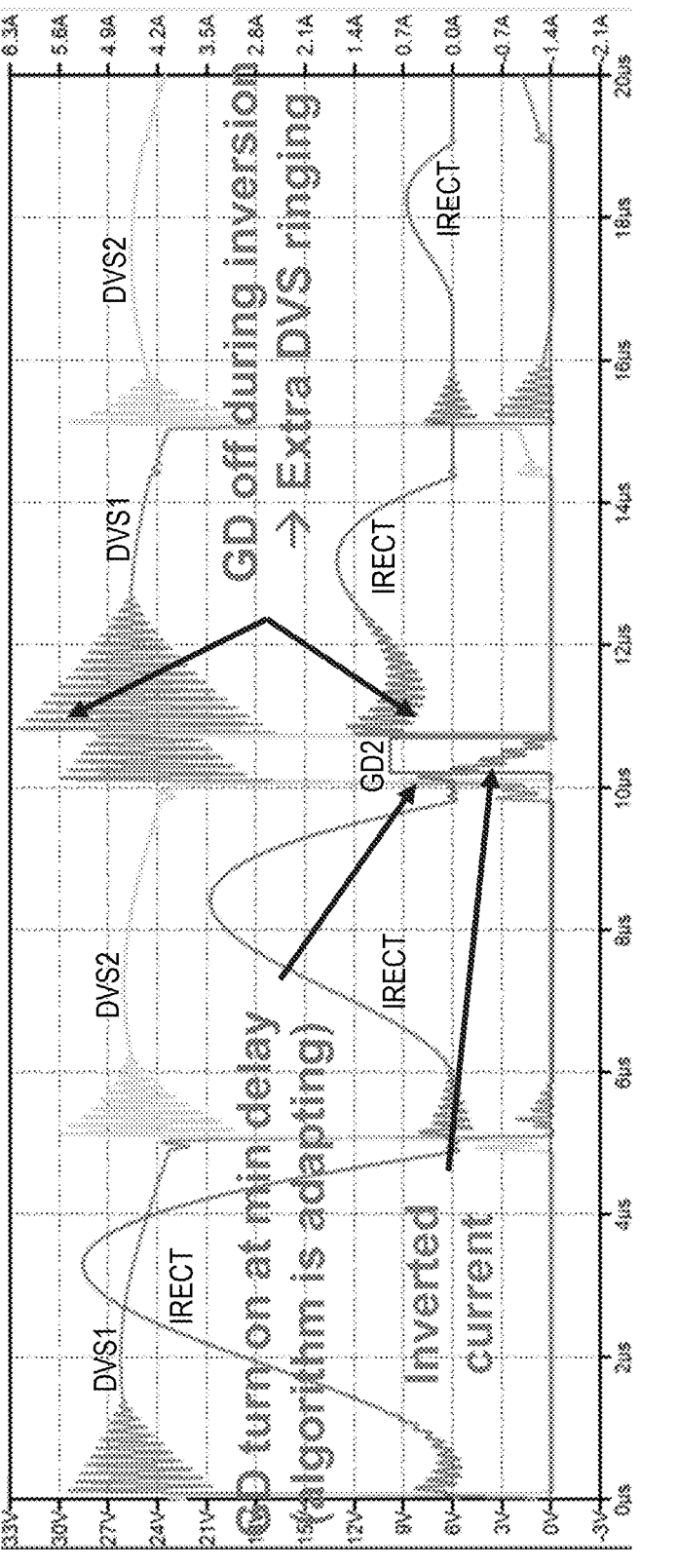
FIG. 6 is a graph showing simulated voltages of the SMPS of FIG. 3 during operation to show the effect of adaptive control of the active rectification stage, with a minimum on-time, in terms of the inverted current and drain-to-source voltage ringing when the gate drive signal to the rectifying MOSFET is turned off after the minimum on-time.
Figure 7:
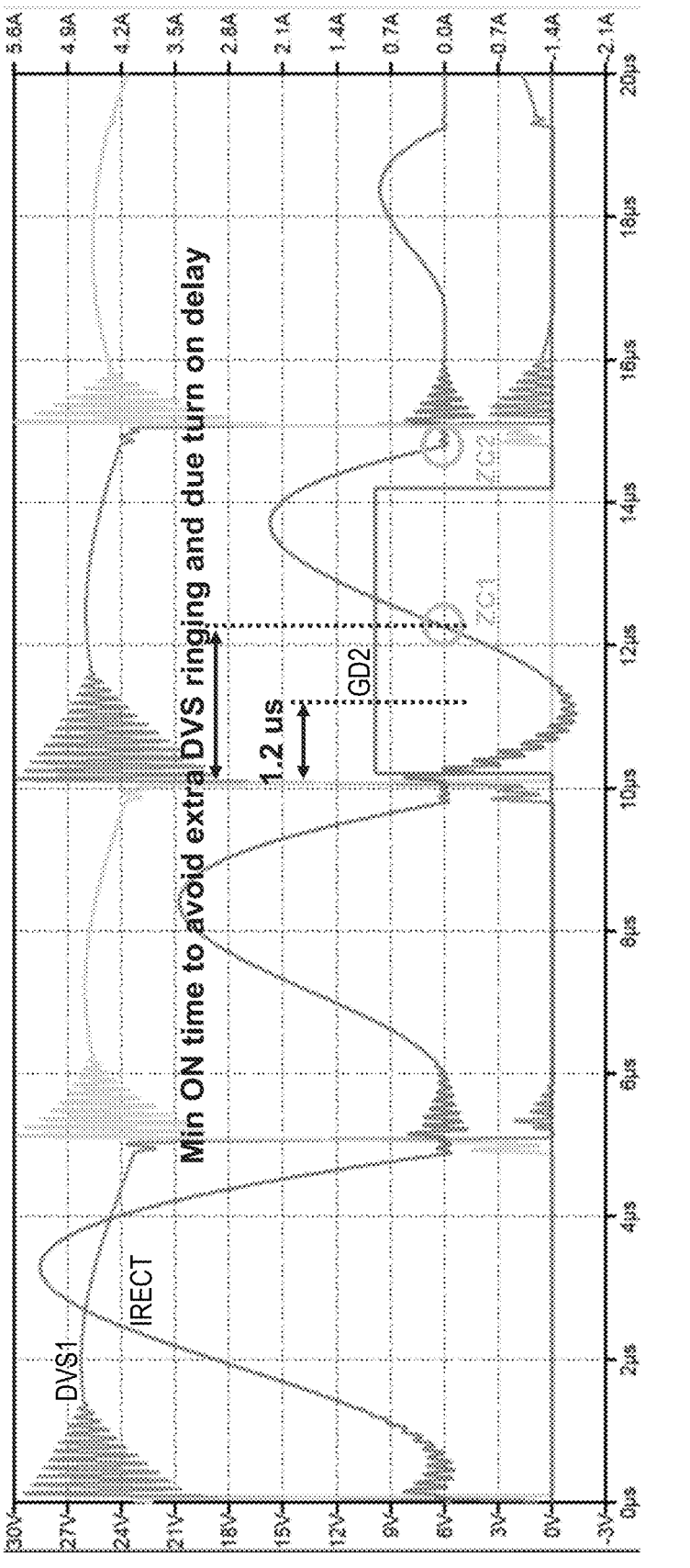
FIG. 7 is a graph showing simulated voltages of the SMPS of FIG. 3 during operation to highlight how: (1) if the gate drive signal is not turned off after the minimum on-time, the inversion is recovered in a phase lasting from assertion of the gate drive signal to the positive zero-crossing of the rectified current; (2) if the gate drive signal is turned off after the positive zero-crossing of the rectified current and prior to the negative zero-crossing of the rectified current, there is no drain-to-source voltage ringing; and (3) if a timer is utilized to measure the time needed for inversion recovery (e.g., the phase lasting from assertion of the gate drive signal to the positive zero-crossing of the rectified current), then this time can be applied to the turn-on delay filter at the next cycle to adjust the turn-on times for the transistors of the active rectification stage.

This operation can be seen in the graphs contained in FIGS. 5-7. Observe first FIG. 5, showing how the rectified current IRECT pulse shifts forward as the load is reduced. The marking of 1.2 us is to indicate that, in the current cycle, 1.2 us after the rise in DVS1 resulting from assertion of gate drive signal GD1 by controller 15 to turn on transistor MN3, the controller 15 can begin monitoring DVS1. In this example, no current inversion is present for purposes of illustration—the operation illustrated in FIG. 5 is as desired.

Now turn to FIG. 6, showing a phase in which the current inversion is permitted to occur after the assertion of GD2, but the gate drive signal GD2 is turned on after a minimum delay after toggling of the secondary side transistors MN3 and MN4. Note the extra ringing on DVS1 resulting from the gate drive signal GD2 being turned on during the current inversion.

Consider now to FIG. 7, showing the calibration cycle in which the gate drive signal GD2 is kept on to provide for sufficient time for the current inversion to end, and the time between assertion of the gate drive signal GD2 and the end of the current inversion is measured and stored by the controller 15. The end of the current inversion is the point at which the rectified current IRECT experiences a positive zero-cross, labelled as ZC1. The controller 15 may also measure the time between assertion of the gate drive signal GD2 and the point at which the rectified current IRECT experiences a negative zero-cross occurring after the positive zero-cross, labelled as ZC2. This point would conventionally become the turn-off time for GD2, but the controller 15 may instead set a new turn-off time during the calibration cycle so as to turn-off transistor MN4 by deasserting gate drive signal GD2 prior to ZC2 so as to avoid extra ringing on DVS2 during the next cycle.

Figure 8:
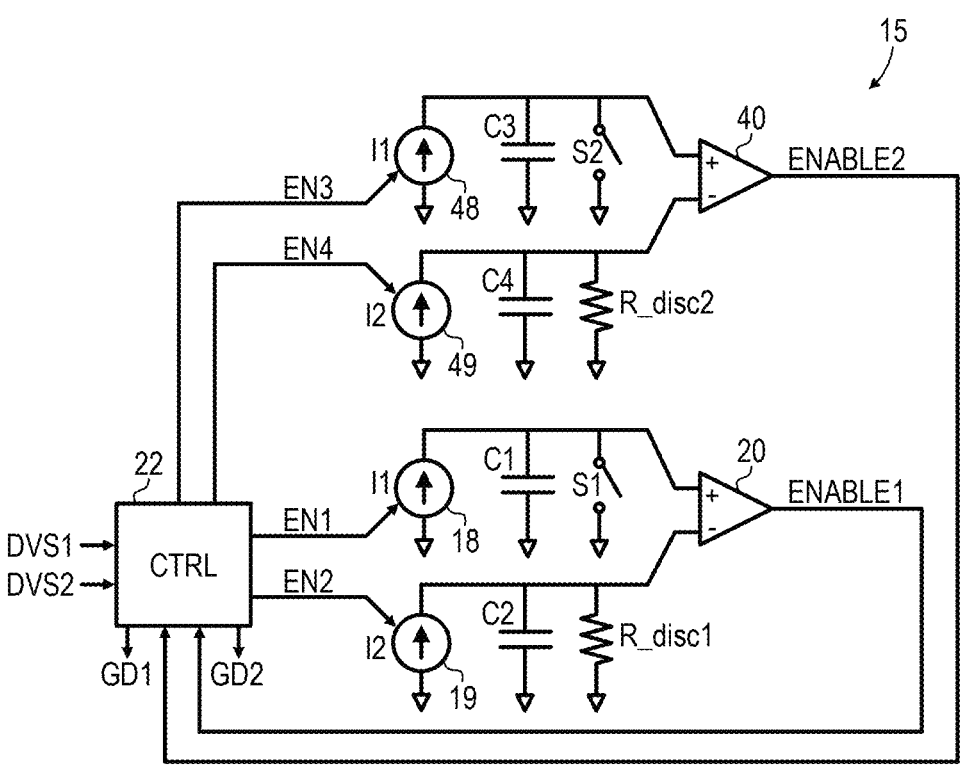
FIG. 8 is a schematic block diagram of an embodiment of the controller of the SMPS of FIG. 3, as configured to control timing of the turn-on times for the transistors of the active rectification stage.

Now described with reference to FIG. 8 is an example implementation of the controller 15. At least a portion of the controller 15 includes a current source 18, capacitor C1, and switch S1 connected in parallel between the non-inverting terminal of a comparator 20 and ground, and includes a current source 19, capacitor C2, and resistor R_disc1 connected in parallel between the inverting terminal of the comparator 20 and ground. Also included are a current source 48, capacitor C3, and switch S2 connected in parallel between the non-inverting terminal of a comparator 40 and ground, and includes a current source 49, capacitor C4, and resistor R_disc2 connected in parallel between the inverting terminal of the comparator 40 and ground.

A control circuit 22 receives the drain-to-source voltages DVS1 and DVS2, as well as enable signals ENABLE1 and ENABLE2 as input, generates the gate drive signals GD1 and GD2 as output, and generates enable signals EN1 and EN2.

At the beginning of the calibration cycle, capacitor C2 will have been previously discharged through the resistor R_disc1. When the current inversion occurs (for example, in the dashed box of FIG. 4, when the gate drive signal GD1 is kept high after the capacitive spike that follows the commutation of DVS1 has reached zero from positive and so goes negative, meaning that the current is inverted), the control circuit 22 asserts EN2 to enable current source 19 to source current I2 to charge capacitor C2. When the current inversion ceases, indicated by a positive zero crossing of the rectified current IRECT, the control circuit 22 deasserts EN2 to disable current source 19 so that the voltage across capacitor C2 is representative of the turn-on delay TON_DELAY to be utilized for the branch including Ls1 during the next cycle of normal operation. This positive zero crossing of the rectified current IRECT is generally determined from the sign of the drain-to-source voltage signal of the conducting transistor. If the current flow is from primary to secondary, the conducting transistor is crossed by the current from source to drain, so the voltage across the transistor is $-RDS\_ON \times ISR$, with RDS_ON being the channel resistance and ISR being the current. When the inversion occurs, the current flows from drain to source so the voltage across the transistor is $RDS\_ON \times IS$.

Similarly, at the beginning of the calibration cycle, capacitor C4 will have been previously discharged through the resistor R_disc2. When the current inversion occurs, which can be observed when the rectified current IRECT goes negative while the gate drive signal GD2 is high (although this case is not shown in FIG. 4), the control circuit 22 asserts EN4 to enable current source 49 to source current I2 to charge capacitor C4. When the current inversion ceases, indicated by a positive zero crossing of the rectified current IRECT, the control circuit 22 deasserts EN4 to disable current source 49 so that the voltage across capacitor C4 is representative of the turn-on delay TON_DELAY to be utilized for the branch including Ls2 during the next cycle of normal operation.

During the next cycle, normal operation resumes. At the beginning of each cycle, the capacitor C1 has already been fully discharged through the previous closing of switch S1 by the control circuit 22 at the end of the previous cycle. Therefore, at the beginning of each cycle, switch S1 is opened by control circuit 22, which asserts EN1 to enable current source 18 to source current I1 to charge capacitor C1. When the voltage across capacitor C1 (representative of the elapsed time during the current cycle) becomes at least equal to the voltage across capacitor C2, the comparator 20 asserts the enable signal ENABLE1 at its output. When the enable signal ENABLE1 is asserted and the drain-to-source voltage signal of the transistor of the conducting branch is less than the turn-on threshold (e.g., generally corresponding to the forward bias of the body diode of the transistor of the conducting branch), the controller 15 then asserts GD1. Thus, through this action, turn-on of MN3 has been delayed by TON_DELAY1. Also at the beginning of each cycle, the capacitor C3 has already been fully discharged through the previous closing of switch S2 by the control circuit 22 at the end of the previous cycle. Therefore, switch S2 is opened by control circuit 22, which asserts EN3 to enable current source 48 to source current I1 to charge capacitor C3. When the voltage across capacitor C3 (representative of the elapsed time during the current cycle) becomes at least equal to the voltage across capacitor C4, the comparator 40 asserts the enable signal ENABLE2 at its output. When the enable signal ENABLE2 is asserted and the drain-to-source voltage signal of the transistor of the conducting branch is less than the turn-on threshold, the controller 15 then asserts GD2. Through this action, turn-on of MN4 has been delayed by TON_DELAY2.

Figure 9:
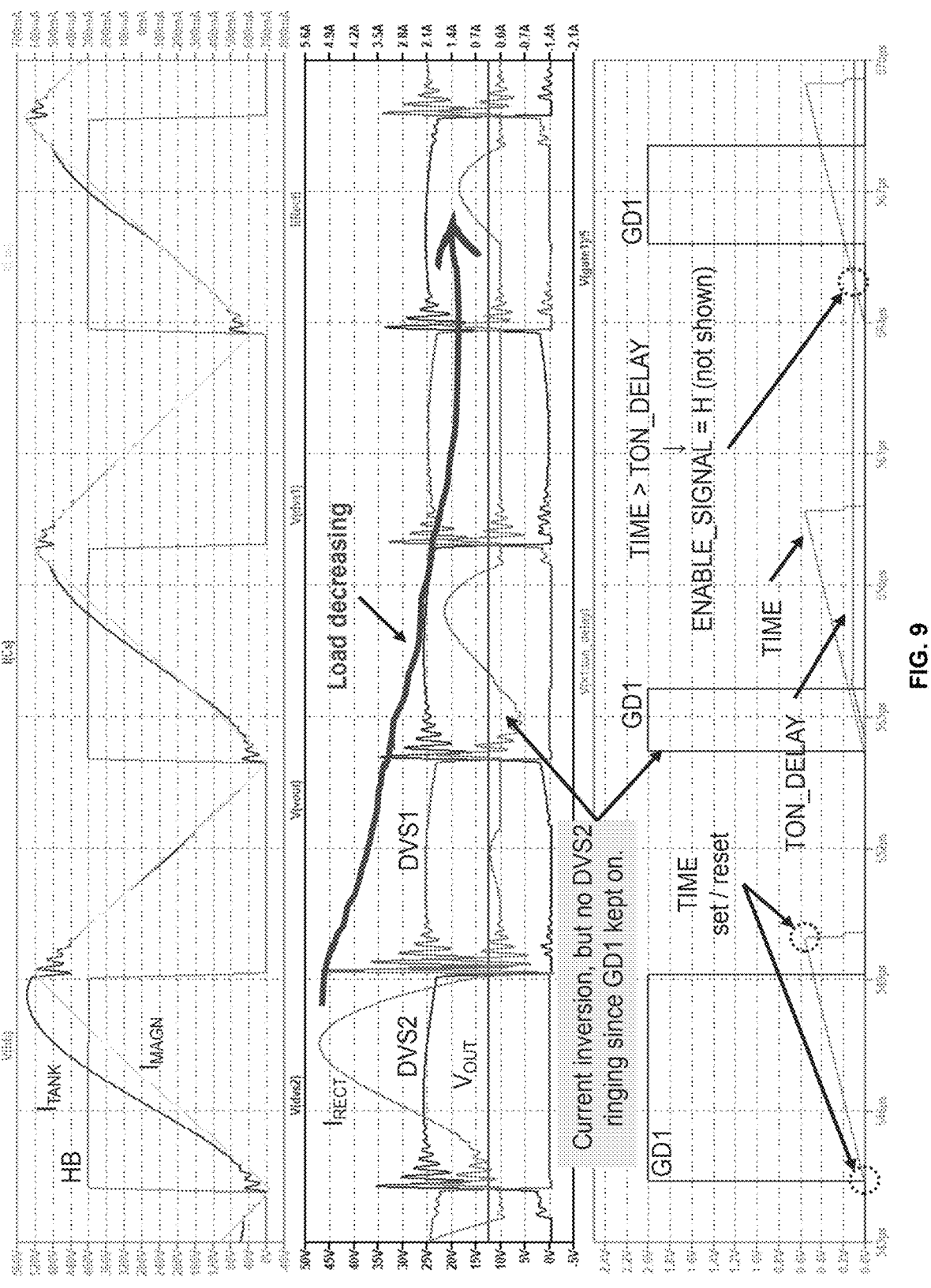
FIG. 9 is a graph showing voltages and currents of the SMPS of FIG. 3 and the controller of FIG. 8 during operation in which a current inversion, during the turn-on phase, is permitted to occur so as to measure the duration of the current inversion, with this measured duration then being used to adjust the turn-on times for the transistors of the active rectification stage.

This operation can be readily observed under different load conditions in the simulation shown in FIG. 9.

During the first cycle of the half-bridge HB, the current pulse IRECT starts as soon as the half-bridge is toggled, and therefore, the gate drive signal GD1 starts immediately so that the conduction in the channel begins. Note that this is a high-load condition, which can be observed the high peak of the rectified current IRECT.

At the next cycle of the half-bridge, the load has decreased. Therefore, in this cycle, the pulse of the rectified current IRECT has started with a delay with respect to the half-bridge toggling. The gate drive signal GD1 is turned on right after the toggling of the half-bridge, and therefore a current inversion occurs. Note that there is no ringing on DVS2 since GD1 is kept on during the inversion. When the inversion has elapsed, the gate drive signal GD1 is turned off, and the duration of the inversion is measured.

At the next cycle of the half-bridge, this measured duration is used to set the gate drive signal GD1 pulse to start exactly where the rectified current IRECT pulse occurs, and inversion is avoided. Also, there is no ringing on DVS2.

Recall now the presence of the resistor R_disc connected in parallel between the inverting terminal of the comparator 20 and ground in the controller 15. Capacitor C2 will begin to discharge to ground through R_disc over time after the calibration cycle to adapt to load conditions. This way, if current inversion does not reoccur (because, for example, the load demand has increased), capacitor C2 will become fully discharged over time and TON_DELAY will go toward zero as a result. If the current inversion does reoccur (because, for example, the load demand remains the same or decreases), a new calibration cycle will be begun by the controller 15 at the next cycle. As a result, the controller 15 adapts to load conditions over time.

It should be appreciated that the controller 15 shown is just an example and that other analog or digital designs may be utilized to determine the time between the beginning of the conduction cycle (the DVS1/DVS2 or DVS2/DVS1 commutation) and the positive zero cross of the rectified current, and to set the turn-on delay based upon that determined time.

Advantages of the above described turn-on method for the transistors of the synchronous rectifier of a DC-DC LLC resonant converter include quick and accurate determination of the proper turn-on delay to avoid drawbacks and potential damage resulting from current inversion, as well as elimination of excess ringing on the drain-to-source voltages of those transistors.

Since the determination of the proper turn-on timing and delay for the transistors of the synchronous rectifier of the DC-DC LLC resonant converter 10" has been described above, the determination of the proper turn-off timing and delay for those transistors is now described. Recall the discussion above about inductive advance, which can cause a phase shift between DVS1/DVS2 and the actual current through MN3/MN4, and in turn can lead to inaccuracies in turn-off time when the turn-off time is based upon detection of DVS1/DVS2. The controller 15 avoids this issue by monitoring not the conducting branch within the active rectification stage, but by monitoring the non-conducting branch within the active rectification stage.

Figure 10:
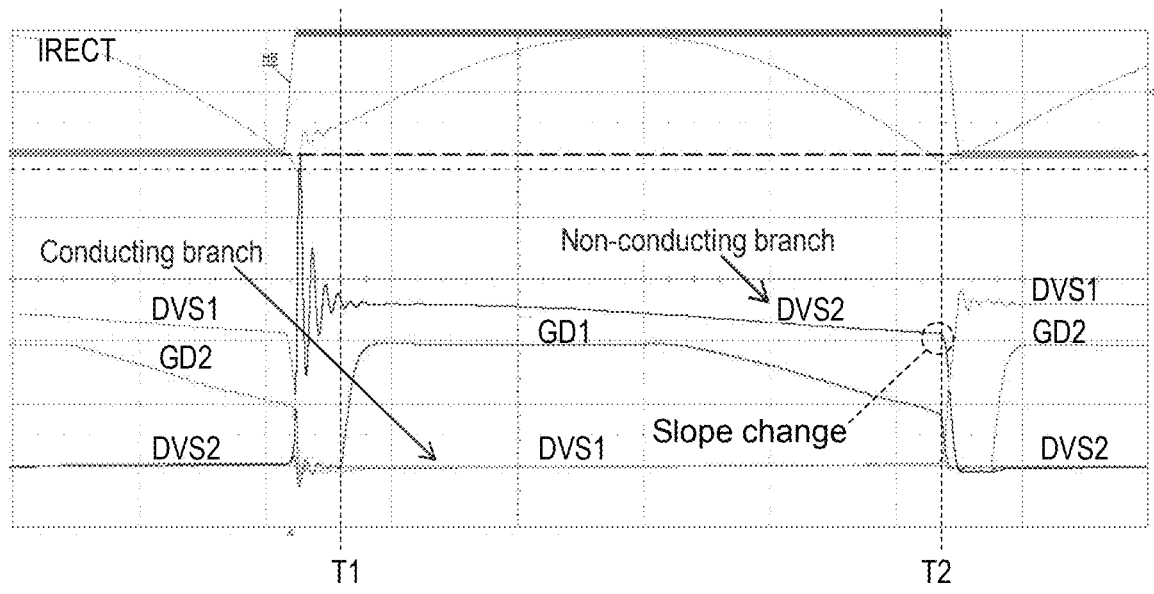
FIG. 10 is a graph showing voltages of the SMPS of FIG. 3 during operation, with the change in slope of the drain-to-source voltage of the transistor of the non-conducting branch of the active rectification stage being shown.

Refer now to the waveforms shown in FIG. 10. Between times T1 and T2, the conducting branch is the branch containing transistor MN3 and secondary Ls1 of FIG. 3 and the non-conducting branch is the branch containing transistor MN4 and the secondary Ls2 of FIG. 3. For the conducting branch, the drain-to-source voltage DVS1 leads the rectified current IRECT shortly after time T2 as a result of inductive advance, but that for the non-conducting branch, the drain-to-source voltage GD2 is not affected by the inductive advance. However, the drain-to-source voltage DVS2 is relatively high, for example being twice the output voltage, making direct detection of DVS2 inconvenient. Therefore, detection of the change in slope of DVS2 is performed by the controller 15 instead.

When transistor MN3 is ON, transistor MN4 is off so the corresponding drain-to-source voltage DVS2 is about 2×VOUT due to Kirchhoff's Voltage Law, and the voltage VOUT is sustained by secondary winding Ls1. At time T2, the half bridge at the primary side toggles and secondary winding should then follow, with transistor MN3 switching off and transistor MN4 switching on.

Figure 1:
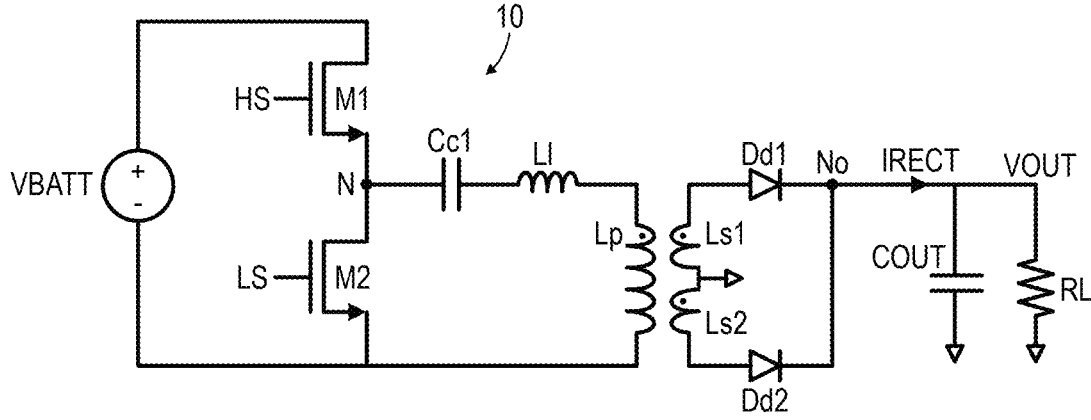
FIG. 1 is a schematic diagram of a switched mode power supply (SMPS) with a passive rectification stage, as known in the prior art.
Figure 2:
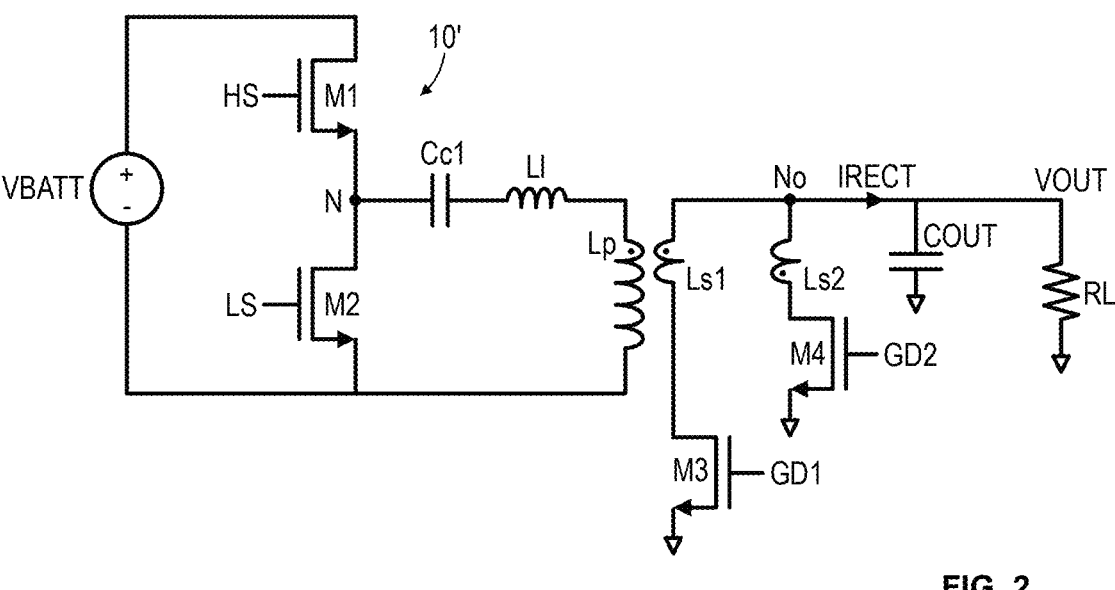
FIG. 2 is a schematic diagram of a SMPS with an active rectification stage, as known in the prior art.

In case of diode rectification such as the prior art case of FIG. 1, everything goes properly because diodes are automatic switches. In case of synchronous rectification, the conducting secondary branch must be properly released (the gate drive signal to its transistor must be turned off), while the non-conducting secondary branch is free to follow the toggling of the half-bridge. In the specific case of the operation of the DC-DC LLC resonant converter 10" shown in FIG. 10, the drain-to-source voltage DVS2 is time aligned to the zero crossing of the rectified current in the conducting branch. Therefore, to provide for this operation, the variation in slope of DVS2 can be used as the trigger for deasserting GD1.

Figure 11:
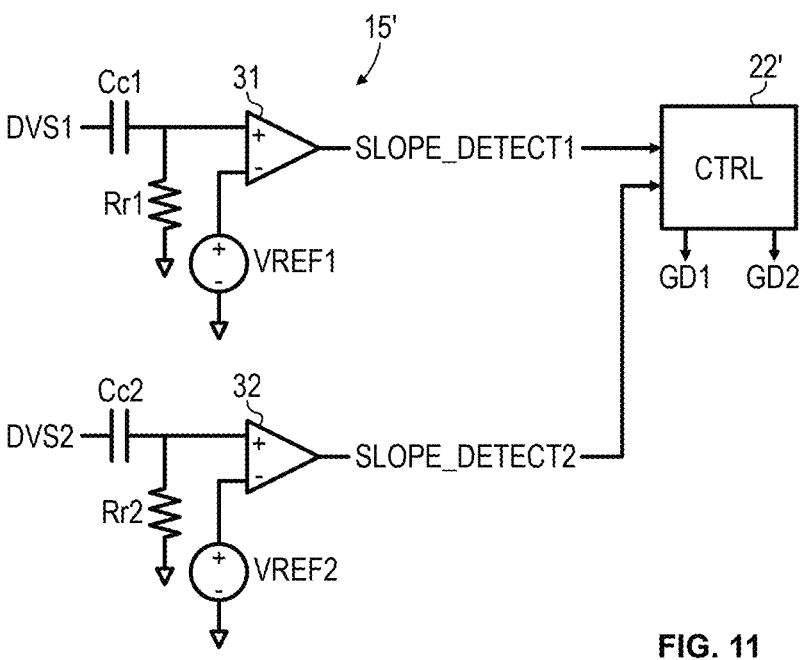
FIG. 11 is a schematic block diagram of a first embodiment of the controller of the SMPS of FIG. 3, as configured to control timing of the turn-off times for the transistors of the active rectification stage.

Now described with reference to FIG. 11 is a first example embodiment of components of the controller 15' to facilitate this slope detection. Here, the controller 15' includes a comparator 31 having its non-inverting input coupled to a reference voltage VREF1 and its inverting input coupled to the drain-to-source voltage DVS1 through capacitor Cc1, with a resistor Rr1 being connected between the inverting input and ground. The slope change detection signal SLOPE_DETECT1 is generated at the output of the comparator 31. A control circuit 22' receives the slope change detection signal SLOPE_DETECT1 as input and, based thereupon, generates or modifies generation of the gate drive signals GD1 and GD2.

The controller 15' further includes a comparator 32 having its non-inverting input coupled to a reference voltage VREF2 and its inverting input coupled to the drain-to-source voltage DVS2 through capacitor Cc2, with a resistor Rr2 being connected between the inverting input and ground. The slope change detection signal SLOPE_DETECT2 is generated at the output of the comparator 32. The control circuit 22' also receives the slope change detection signal SLOPE_DETECT2 as input and, based thereupon, generates or modifies generation of the gate drive signals GD1 and GD2.

The capacitor Cc1 and resistor Rr1 act as a derivative filter—the voltage across resistor Rr1 will be proportional to the derivative of the drain-to-source voltage DVS1 so that rapid changes in the input signal (high-frequency components or sudden transitions) result in higher voltage across the resistor Rr1 due to the faster charging or discharging of the capacitor Cc1, effectively highlighting the rate of change of the DVS1 signal rather than its absolute value. Thus, the voltage across resistor Rr1 is representative of the slope of DVS1. When the slope is greater than the reference voltage VREF1, this is indicative of a change in the slope of DVS1, and the comparator 31 asserts SLOPE_DETECT1 in response.

The capacitor Cc2 and resistor Rr2 likewise act as a derivative filter so that the voltage across resistor Rr2 will be proportional to the derivative of the drain-to-source voltage DVS2 so that rapid changes in the input signal (high-frequency components or sudden transitions) result in higher voltage across the resistor Rr2 due to the faster charging or discharging of the capacitor Cc2, effectively highlighting the rate of change of the DVS2 signal rather than its absolute value. Thus, the voltage across resistor Rr2 is representative of the slope of DVS2. When the slope is greater than the reference voltage VREF2, this is indicative of a change in the slope of DVS2, and the comparator 31 asserts SLOPE_DETECT2 in response.

Figure 12:
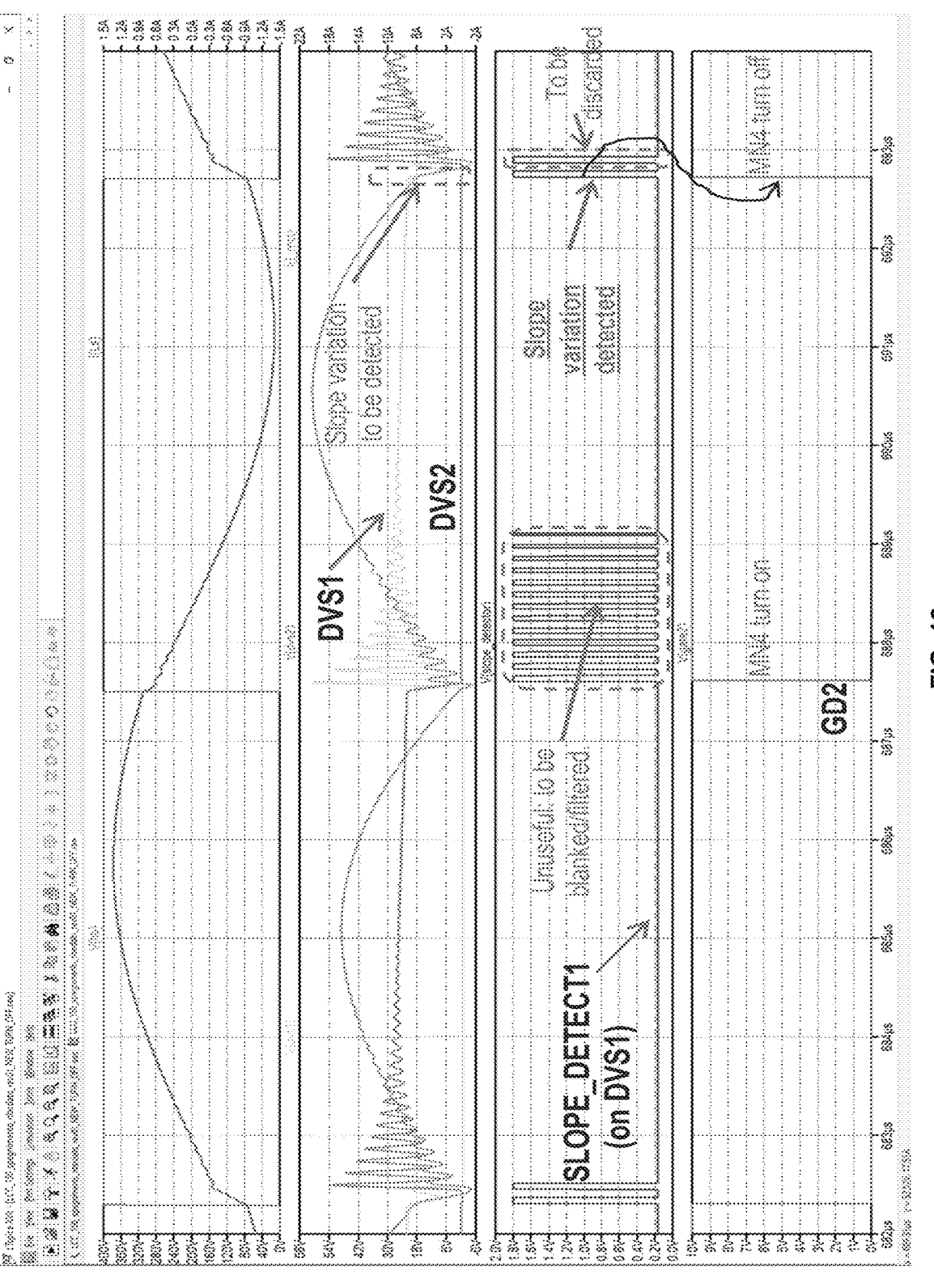
FIG. 12 is a graph showing voltages and currents of the SMPS of FIG. 3 and the controller of FIG. 11 during operation in which a change in slope of the drain-to-source voltage of the transistor of the non-conducting branch of the active rectification stage is detected, and in which the turn-off time of the transistor of the conducting branch of the active rectification stage is adjusted based upon that change in slope.

Refer now to FIG. 12, showing waveforms of the drain-to-source voltage DVS1, slope change detection signal SLOPE_DETECT1, and gate drive signal GD2 for an operating instance where the branch including transistor MN4 and secondary winding Ls2 toggle from being the non-conducting branch to being the conducting branch. While the comparator 31 detects the change in slope in DVS1 at the turn-on of MN4 resulting from assertion of GD2, the control circuit 22' ignores SLOPE_DETECT1 at the rising edge of GD2 for a blanking period. At the next slope change of DVS1 detected by comparator 31 after the blanking period, the control circuit 22' deasserts GD2 to thereby turn-off MN4 at a time coinciding with the zero-crossing of the rectified current IRECT. Assertions of SLOPE_DETECT1 after the falling edge of GD2 and prior to the next rising edge of GD2 are ignored by the control circuit 22'.

Operation proceeds the same for operating instances where the branch including transistor MN3 and secondary winding Ls1 is the non-conducting branch.

Figure 13:
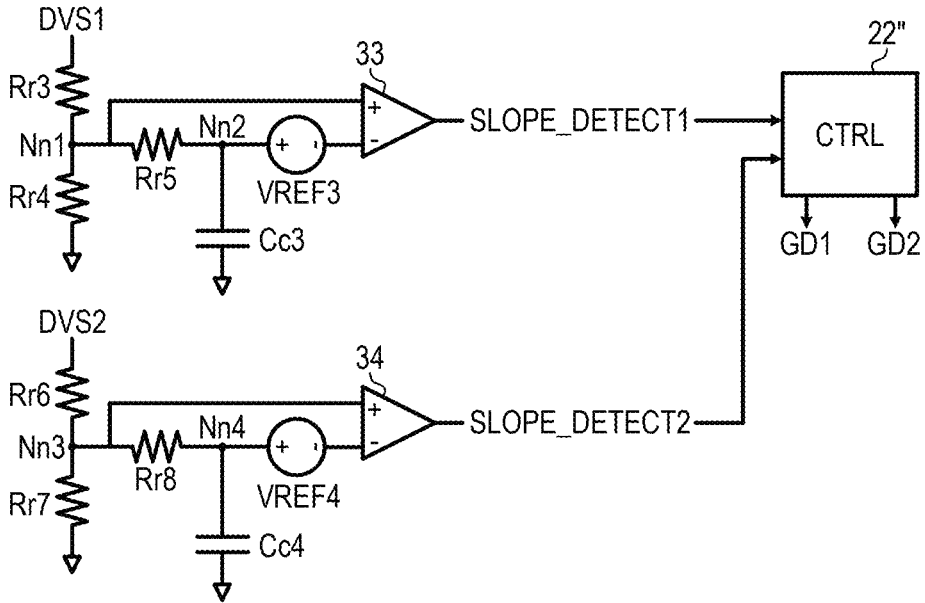
FIG. 13 is a schematic block diagram of a second embodiment of the controller of the SMPS of FIG. 3, as configured to control timing of the turn-off times for the transistors of the active rectification stage.

Now described with reference to FIG. 13 is a second example embodiment of components of the controller 15" to facilitate this slope detection. Here, the controller 15" includes a comparator 33 having its inverting input coupled to node Nn1. A resistor Rr3 is connected between the drain-to-source voltage DVS1 and node Nn1 and a resistor Rr4 is connected between node Nn1 and ground. A resistor Rr5 is connected between nodes Nn1 and Nn2, with a capacitor Cc3 being connected between node Nn2 and ground. An offset voltage VREF3 is added to the voltage at node Nn2 and applied to the non-inverting input of the comparator 33. The slope change detection signal SLOPE_DETECT1 is generated at the output of comparator 33. A control circuit 22' receives the slope change detection signal SLOPE_DETECT1 as input and, based thereupon, generates or modifies generation of the gate drive signals GD1 and GD2.

The controller 15" further includes a comparator 34 having its inverting input coupled to node Nn3. A resistor Rr6 is connected between the drain-to-source voltage DVS2 and node Nn2 and a resistor Rr7 is connected between node Nn2 and ground. A resistor Rr8 is connected between nodes Nn3 and Nn4, with a capacitor Cc4 being connected between node Nn4 and ground. An offset voltage VREF4 is added to the voltage at node Nn4 and applied to the non-inverting input of the comparator 34. The slope change detection signal SLOPE_DETECT2 is generated at the output of comparator 34. The control circuit 22' also receives the slope change detection signal SLOPE_DETECT2 as input and, based thereupon, generates or modifies generation of the gate drive signals GD1 and GD2.

The voltage at node Nn1 is a divided version of DVS1, and the voltage at Nn2 is the result of the low-pass filtering action of the Rr5/Cc3 network on the voltage from Nn1, with an added offset voltage VREF3 applied prior to coupling to the non-inverting input of the comparator 22.

Since the voltage at Nn1 reflects changes in DVS1, an abrupt change in DVS1 will cause an immediate variation in the voltage at Nn1. The low-pass filter formed by Rr5 and Cc3 will cause the signal at Nn2 to respond more slowly to sharp changes in DVS1. The filtering smooths out rapid fluctuations, so sharp changes in the slope to the signal will be less pronounced and delayed at Nn2 compared to Nn1. The comparator 33 compares the immediate, less-filtered voltage at Nn1 against the smoothed and offset-adjusted voltage at Nn2. Therefore, when DVS1 changes sharply, causing a significant difference between the voltages at Nn1 and Nn2, the comparator 33 will assert SLOPE_DETECT1 to indicate the detection of a slope change.

The voltage at node Nn3 is a divided version of DVS2, and the voltage at Nn4 is the result of the low-pass filtering action of the Rr8/Cc4 network on the voltage from Nn3, with an added offset voltage VREF4 applied prior to coupling to the non-inverting input of the comparator 34.

Similarly, the voltage at Nn3 reflects changes in DVS2 so that an abrupt change in DVS2 will cause an immediate variation in the voltage at Nn3. The low-pass filter formed by Rr8 and Cc4 will cause the signal at Nn4 to respond more slowly to sharp changes in DVS2. The comparator 34 compares the immediate, less-filtered voltage at Nn3 against the smoothed and offset-adjusted voltage at Nn4. Therefore, when DVS2 changes sharply, causing a significant difference between the voltages at Nn3 and Nn4, the comparator 34 will assert SLOPE_DETECT2 to indicate the detection of a slope change.

Figure 14:
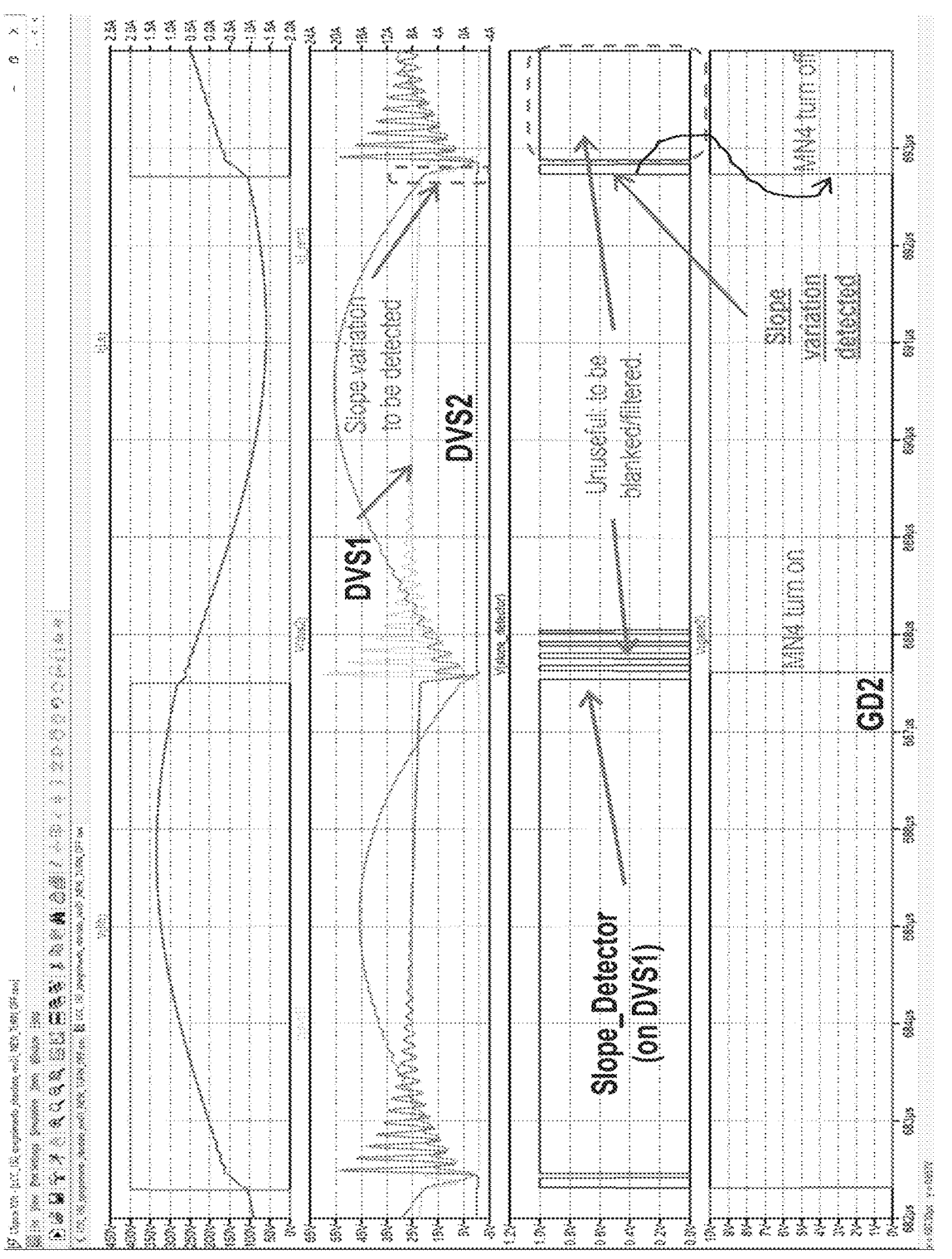
FIG. 14 is a graph showing voltages and currents of the SMPS of FIG. 3 and the controller of FIG. 13 during operation in which a change in slope of the drain-to-source voltage of the transistor of the non-conducting branch of the active rectification stage is detected, and in which the turn-off time of the transistor of the conducting branch of the active rectification stage is adjusted based upon that change in slope.

Refer now to FIG. 14, showing waveforms of the drain-to-source voltage DVS1, slope change detection signal SLOPE_DETECT1, and gate drive signal GD2 for an operating instance where the branch including transistor MN4 and secondary winding Ls2 toggle from being the non-conducting branch to being the conducting branch. While the comparator 33 detects the change in slope in DVS1 at the turn-on of MN4 resulting from assertion of GD2, the control circuit 22" ignores SLOPE_DETECT1 at the rising edge of GD2 for a blanking period. At the next slope change of DVS1 detected by comparator 33 after the blanking period, the control circuit 22" deasserts GD2 to thereby turn-off MN4 at a time coinciding with the zero-crossing of the rectified current IRECT. Assertions of SLOPE_DETECT1 after the falling edge of GD2 and prior to the next rising edge of GD2 are ignored by the control circuit 22".

Operation proceeds the same for operating instances where the branch including transistor MN3 and secondary winding Ls1 is the non-conducting branch.

Control of the turn-off of transistors MN3 and MN4 provided by the controller 15' or 15" as described above provides for simpler circuitry than direct zero-cross detection of the rectified current or for monitoring of the conducting branch in the active rectification circuit in cases where the switching frequency is above resonance.

Finally, it is evident that modifications and variations can be made to what has been described and illustrated herein without departing from the scope of this disclosure.

Although this disclosure has been described with a limited number of embodiments, those skilled in the art, having the benefit of this disclosure, can envision other embodiments that do not deviate from the disclosed scope. Furthermore, skilled persons can envision embodiments that represent various combinations of the embodiments disclosed herein made in various ways.

The invention claimed is:

1. A synchronous rectifier circuit, comprising:

a first secondary winding connected between an output node and a first rectification transistor, the first secondary winding configured to be magnetically coupled to a primary winding;

wherein the first rectification transistor is connected between the first secondary winding and ground;

wherein the first rectification transistor is configured to be operable to perform rectification during a normal operating cycle; and a controller configured to control the first rectification transistor to perform synchronous rectification by:

in a calibration cycle:

measuring a first elapsed time beginning at commutation of a drain-to-source voltage of the first rectification transistor, continuing through inversion of a current in the first secondary winding, and ending at a next zero crossing of the current in the first secondary winding, to thereby determine a first delay time; and in a normal operating cycle occurring immediately subsequent to the calibration cycle:

delaying turn-on of the first rectification transistor with respect to the commutation of the drain-to-source voltage of the first rectification transistor by an amount at least equal to the determined first delay time, and then turning on the first rectification transistor after the amount; and turning off the first rectification transistor.

2. The synchronous rectifier circuit of claim 1, wherein the controller causes the first rectification transistor to perform the calibration cycle in response to detection of inversion of the current in the first secondary winding.

3. The synchronous rectifier circuit of claim 2, wherein the controller is configured to slowly decrease the delaying of the turn-on of the first rectification transistor over time so that the amount eventually decreases to zero if the detection of the inversion of current in the first secondary winding does not reoccur.

4. The synchronous rectifier circuit of claim 1, wherein the controller, in the calibration cycle, measures the first elapsed time beginning at the commutation of the drain-to-source voltage of the first rectification transistor, continuing through the inversion of the current in the first secondary winding that results in the current in the first secondary winding becoming negative, and ending at a next negative-to-positive zero crossing of the current in the first secondary winding, to thereby determine the first delay time.

5. The synchronous rectifier circuit of claim 1, wherein the controller comprises:

a first comparator;

a first current source and first capacitor coupled in parallel between a non-inverting input of the first comparator and ground;

a second current source and a second capacitor coupled in parallel between an inverting input of the first comparator and ground; and control circuitry configured to, during the normal operating cycle:

enable the second current source so that it sources current to the second capacitor during a first elapsed time occurring during the inversion of the current in the first secondary winding, and disable the second current source at the ending of the first elapsed time; and enable the first current source at commutation of the drain-to-source voltage of the first rectification transistor so that the first current source sources current to the first capacitor, activate the first rectification transistor when an output of the first comparator is asserted to indicate that a voltage across the first capacitor has become at least equal to a voltage across the second capacitor, and discharge the first capacitor through a first switch and disable the first current source at an end of the normal operating cycle.

6. The synchronous rectifier circuit of claim 5, wherein the control circuitry is configured to detect the inversion of the current in the first secondary winding based upon the drain-to-source voltage of the first rectification transistor.

7. The synchronous rectifier circuit of claim 5, wherein the controller further comprises a first discharge resistor connected between the inverting input of the first comparator and ground.

8. The synchronous rectifier circuit of claim 1, further comprising a second secondary winding connected between the output node and a second rectification transistor, the second secondary winding configured to be magnetically coupled to the primary winding;

wherein the second rectification transistor is connected between the second secondary winding and ground;

wherein the second rectification transistor is also configured to be alternatingly operable to perform rectification during the normal operating cycle;

wherein the controller is also configured to control the second rectification transistor to perform synchronous rectification by, in the calibration cycle, measuring a second elapsed time beginning at commutation of a drain-to-source voltage of the second rectification transistor, continuing through inversion of a current in the second secondary winding, and ending at a next zero crossing of the current in the second secondary winding, to thereby determine a second delay time; and wherein the controller is also configured to control the second rectification transistor to perform synchronous rectification by, in the normal operating cycle occurring immediately subsequent to the calibration cycle:

delaying turn-on of the second rectification transistor with respect to the commutation of the drain-to-source voltage of the second rectification transistor by a second amount at least equal to the determined second delay time, and then turning on the second rectification transistor after the second amount; and turning off the second rectification transistor.

9. The synchronous rectifier circuit of claim 8, wherein the delaying of the turn-on of the first rectification transistor by the amount at least equal to the determined first delay time serves to avoid excess ringing of a drain-to-source voltage of the second rectification transistor; and wherein the delaying of the turn-on of the second rectification transistor by the second amount at least equal to the determined second delay time serves to avoid excess ringing of a drain-to-source voltage of the first rectification transistor.

10. The synchronous rectifier circuit of claim 8,
wherein the controller causes the first rectification transistor to perform the calibration cycle in response to detection of inversion of the current in the first secondary winding;
wherein the controller causes the second rectification transistor to perform the calibration cycle in response to detection of inversion of the current in the second secondary winding;
wherein the controller is configured to slowly decrease the delaying of the turn-on of the first rectification transistor over time so that the delay eventually decreases to zero if the detection of the inversion of current in the first secondary winding does not reoccur; and
wherein the controller is configured to slowly decrease the delaying of the turn-on of the second rectification transistor over time so that the delay eventually decreases to zero if the detection of the inversion of current in the second secondary winding does not reoccur.

11. The synchronous rectifier circuit of claim 8,
wherein the controller, in the calibration cycle, measures the first elapsed time beginning at the commutation of the drain-to-source voltage of the first rectification transistor, continuing through the inversion of the current in the first secondary winding that results in the current in the first secondary winding becoming negative, and ending at a next negative-to-positive zero crossing of the current in the first secondary winding, to thereby determine the first delay time;
wherein the controller, in the calibration cycle, measures the second elapsed time beginning at the commutation of the drain-to-source voltage of the second rectification transistor, continuing through the inversion of the current in the second secondary winding that results in the current in the second secondary winding becoming negative, and ending at a next negative-to-positive zero crossing of the current in the second secondary winding, to thereby determine the second delay time.

12. The synchronous rectifier circuit of claim 8, wherein the controller comprises:
a first comparator;
a first current source and a first capacitor coupled in parallel between a non-inverting input of the first comparator and ground;
a second current source and a second capacitor coupled in parallel between an inverting input of the first comparator and ground;
a second comparator;
a third current source and a third capacitor coupled in parallel between a non-inverting input of the second comparator and ground;
a fourth current source and a fourth capacitor coupled in parallel between an inverting input of the second comparator and ground; and
control circuitry configured to, during the normal operating cycle:
enable the second current source so that it sources current to the second capacitor during a first elapsed time occurring during the inversion of the current in the first secondary winding, and disable the second current source at the ending of the first elapsed time;
enable the first current source at commutation of the drain-to-source voltage of the first rectification transistor so that the first current source sources current to the first capacitor, activate the first rectification transistor when an output of the first comparator is asserted to indicate that a voltage across the first capacitor has become at least equal to a voltage across the second capacitor, and discharge the first capacitor through a first switch and disable the first current source at an end of the normal operating cycle;
enable the fourth current source so that it sources current to the fourth capacitor during a second elapsed time occurring during the inversion of the current in the second secondary winding, and disable the fourth current source at the ending of the second elapsed time; and
enable the third current source at commutation of the drain-to-source voltage of the second rectification transistor so that the third current source sources current to the third capacitor, activate the second rectification transistor when an output of the second comparator is asserted to indicate that a voltage across the third capacitor has become at least equal to a voltage across the fourth capacitor, and discharge the third capacitor through a second switch and disable the third current source at an end of the normal operating cycle.

13. The synchronous rectifier circuit of claim 12, wherein the control circuitry is configured to detect the inversion of the current in the first secondary winding based upon the drain-to-source voltage of the first rectification transistor; and wherein the control circuitry is configured to detect the inversion of the current in the second secondary winding based upon the drain-to-source voltage of the second rectification transistor.

14. The synchronous rectifier circuit of claim 12, wherein the controller further comprises a first discharge resistor connected between the inverting input of the first comparator and ground and a second discharge resistor connected between the inverting input of the second comparator and ground.

15. A synchronous rectifier circuit, comprising:
a first secondary winding connected between an output node and a first rectification transistor, the first secondary winding configured to be magnetically coupled to a primary winding;
wherein the first rectification transistor is connected between the first secondary winding and ground;
a second secondary winding connected between the output node and a second rectification transistor, the second secondary winding configured to be magnetically coupled to the primary winding;
wherein the second rectification transistor is connected between the second secondary winding and ground;
wherein the first rectification transistor and second rectification transistor are configured to be alternatingly operable to perform rectification during a normal operating cycle; and
a controller configured to control the first rectification transistor and the second rectification transistor to perform synchronous rectification by:
in a normal operating cycle:
turning on the first rectification transistor; and
causing turn-off of the first rectification transistor in response to detection of a substantial change in slope of a drain-to-source voltage of the second rectification transistor.

16. The synchronous rectifier circuit of claim 15, wherein the controller comprises:

a first comparator having a first input coupled to receive a divided version of the drain-to-source voltage of the second rectification transistor;

a first low-pass filter coupled between the divided version of the drain-to-source voltage of the second rectification transistor and a second input of the first comparator, with a first voltage offset being added at an output of the first low-pass filter; and a control circuit configured to:

cause the turn-off of the first rectification transistor in response to assertion of an output of the first comparator.

17. The synchronous rectifier circuit of claim 15, wherein the controller comprises:

a first comparator;

a first derivative filter coupled between the drain-to-source voltage of the second rectification transistor and a first input of the first comparator;

a first reference voltage coupled to a second input of the first comparator; and a control circuit configured to cause the turn-off of the first rectification transistor in response to assertion of an output of the first comparator.

18. The synchronous rectifier circuit of claim 15, wherein the controller is further configured to, in a normal operating cycle:

turning on the second rectification transistor; and causing turn-off of the second rectification transistor in response to detection of a substantial change in slope of a drain-to-source voltage of the first rectification transistor.

19. The synchronous rectifier circuit of claim 18, wherein the controller comprises:

a first comparator having a first input coupled to receive a divided version of the drain-to-source voltage of the second rectification transistor;

a first low-pass filter coupled between the divided version of the drain-to-source voltage of the second rectification tion transistor and a second input of the first comparator, with a first voltage offset being added at an output of the first low-pass filter;

a second comparator having a first input coupled to receive a divided version of the drain-to-source voltage of the first rectification transistor;

a second low-pass filter coupled between the divided version of the drain-to-source voltage of the first rectification transistor and a second input of the second comparator, with a second voltage offset being added at an output of the second low-pass filter; and a control circuit configured to:

cause the turn-off of the first rectification transistor in response to assertion of an output of the first comparator; and cause the turn-off of the second rectification transistor in response to assertion of an output of the second comparator.

20. The synchronous rectifier circuit of claim 18, wherein the controller comprises:

a first comparator;

a first derivative filter coupled between the drain-to-source voltage of the second rectification transistor and a first input of the first comparator;

a first reference voltage coupled to a second input of the first comparator;

a second comparator;

a second derivative filter coupled between the drain-to-source voltage of the first rectification transistor and a first input of the second comparator;

a second reference voltage coupled to a second input of the second comparator; and a control circuit configured to cause the turn-off of the first rectification transistor in response to assertion of an output of the first comparator, and to cause the turn-off of the second rectification transistor in response to assertion of an output of the second comparator.

* * * * *